United States Patent [19]

Knapp

[11] 4,335,915
[45] Jun. 22, 1982

[54] TRUCK TRAILER LOAD COVER (TARPAULIN) RECEIVER

[76] Inventor: Merton C. Knapp, 108 S. Grant, Mount Ayr, Iowa 50854

[21] Appl. No.: 143,366

[22] Filed: Apr. 24, 1980

[51] Int. Cl.³ .............................................. B60J 11/00
[52] U.S. Cl. .................................... 296/98; 296/100; 24/369
[58] Field of Search ........................ 296/100, 98, 141; 248/302, 224.3, 218.2, 218.3; 24/85 R, 85 B, 85 C; 160/354, 368 S

[56] References Cited

U.S. PATENT DOCUMENTS

| | | | |
|---|---|---|---|
| 1,100,738 | 6/1914 | Ilse | 296/141 |
| 1,156,370 | 10/1915 | Pomeroy | 248/224.3 |
| 2,642,638 | 6/1953 | Larrabee | 24/85 C |
| 3,785,694 | 1/1974 | Sargent | 296/98 |

Primary Examiner—Robert R. Song
Attorney, Agent, or Firm—Thomas M. Scofield

[57] ABSTRACT

Load cover or tarpaulin holders, clips and receivers adapted to be used in association with the side panel mountings and retainers thereof of flat bed truck trailers; load cover or tarpaulin retainers, receivers and clips removably associated with flat bed truck trailer side panel mountings; devices for holding, on the side of a flat bed truck trailer outside the load area, an offloaded tarpaulin or load cover.

15 Claims, 8 Drawing Figures

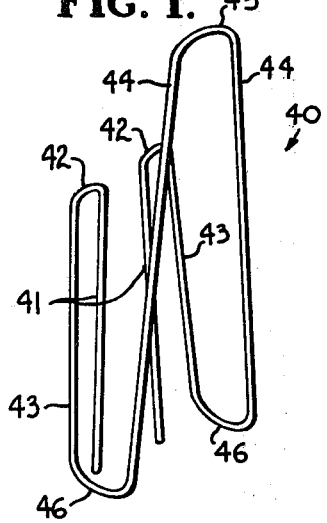
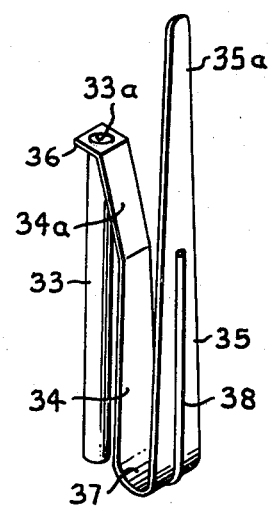
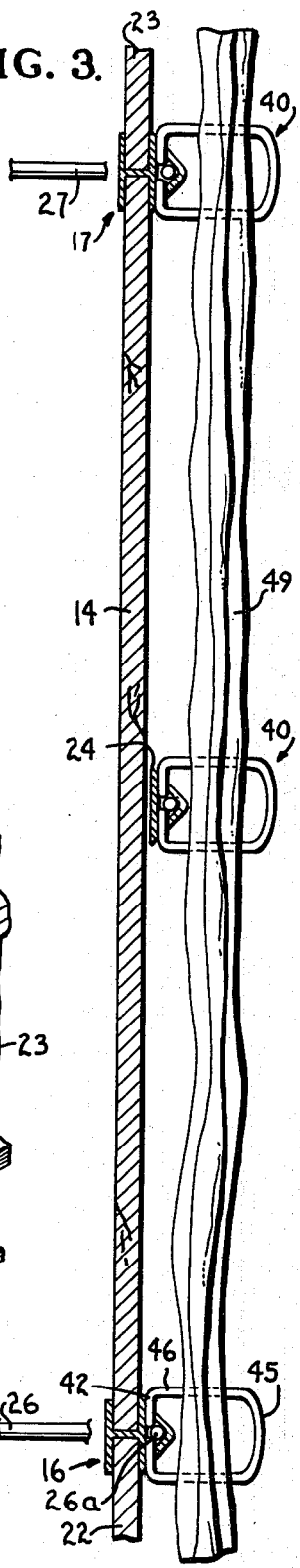
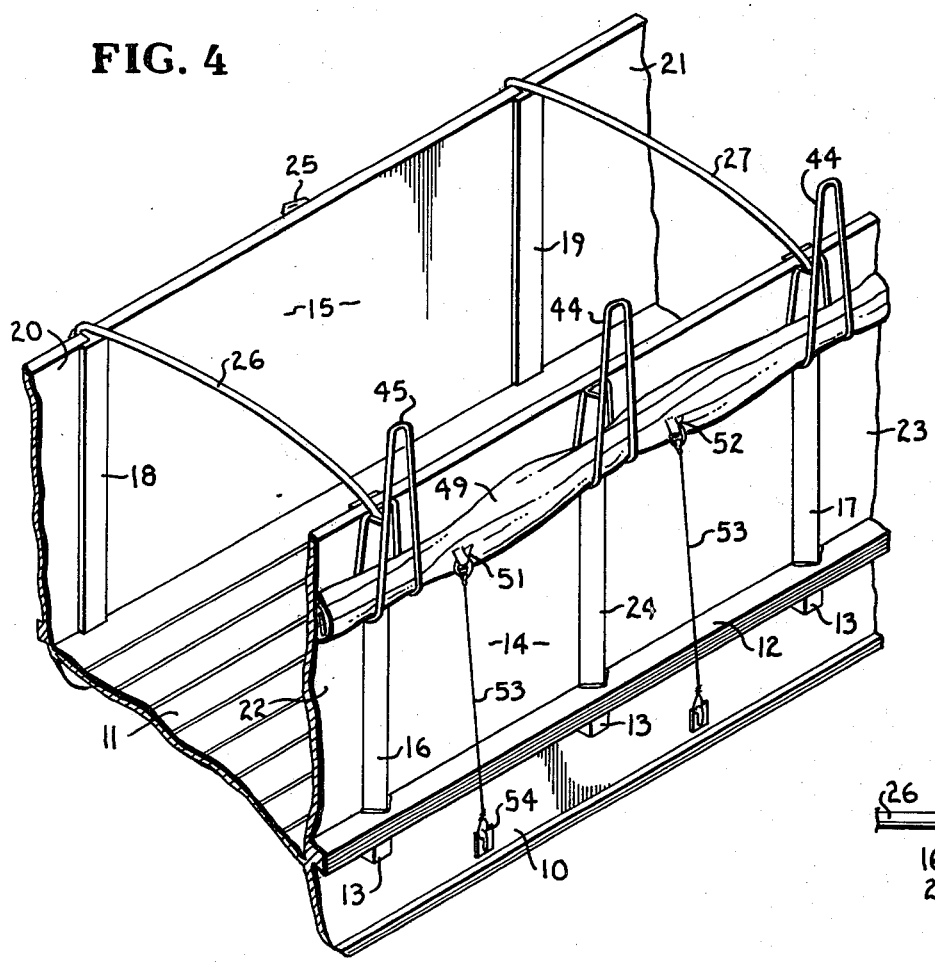

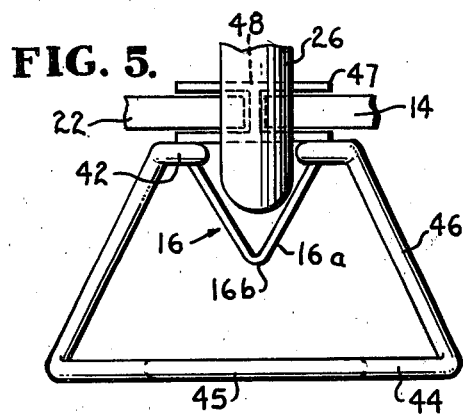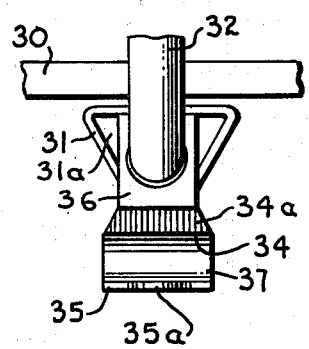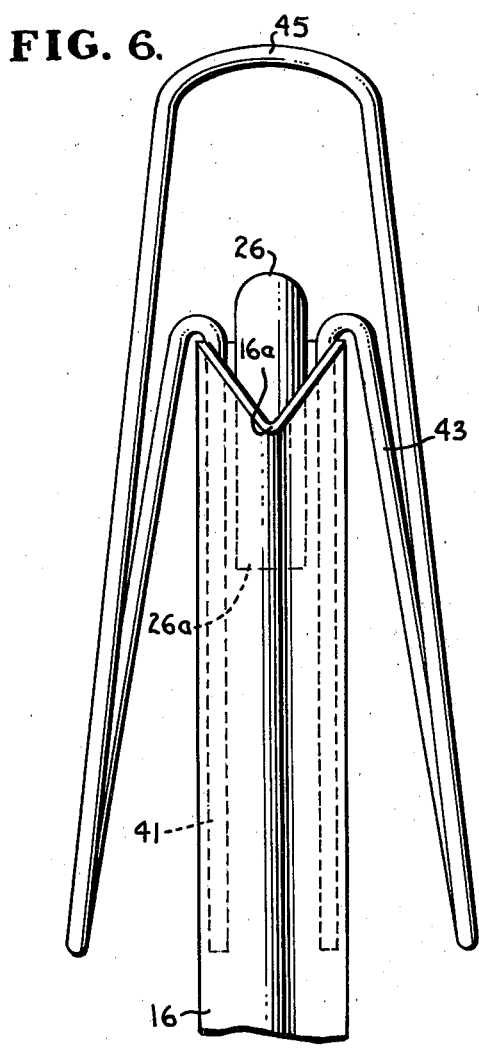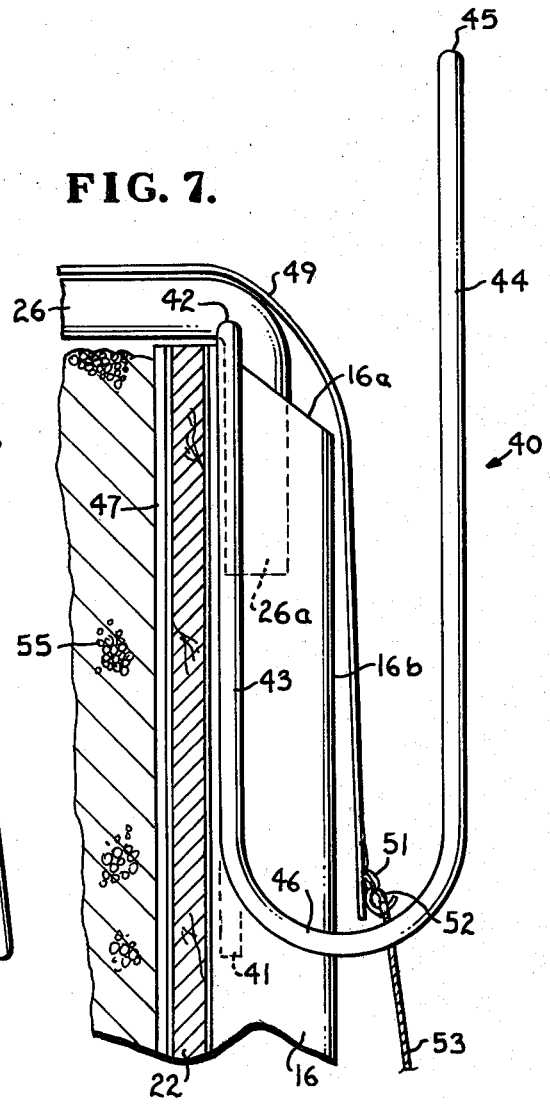

TRUCK TRAILER LOAD COVER (TARPAULIN) RECEIVER

BACKGROUND OF THE INVENTION

Flat bed truck trailers conventionally employ removable side panels thereon which are mounted and retained, or held in position, at the sides and front of the trailer by alternate dividing and backing stakes. Dividing stakes have a T-member extending inboard therefrom, adjacent dividing stakes along the length of the trailer receiving between them the panels with the ends thereof engaged by the T-members. Both the dividing and backing stakes, in the outboard portions thereof, typically are formed in hollow triangular shape. The lower ends of the dividing and backing stakes are removably received in slots formed in the trailer outboard floor portions. Typically, there are some twenty stakes on each side of a flat bed trailer, spaced two feet apart. The panels themselves are four feet long, so the pattern is dividing stake-backing stake-dividing stake, beginning and ending with dividing stakes or their equivalent at the ends.

A tarpaulin is conventionally employed to cover at least certain kinds of loads. Conventionally, side clips have been provided, bolted or otherwise fixedly attached to the upper portions of the outside faces of the panels, for two purposes. A minor such purpose is to limit the downward extension of the tarpaulin side edges as the tarpaulin is deployed over the load. Additionally, and more important, such clips have been employed on at least one side of the truck so that, when the trailer is being loaded or unloaded or the cargo worked in some way, the entire tarpaulin may be laid over to one side, clearing the roof area. It should be noted, additionally, that arcuate beams are conventionally employed over the load anchored (socketed) in the dividing stakes or backing stakes or both.

It is most preferable that the tarp or load cover not have to be fully removed from the trailer.

One conventional difficulty with the prior art clips is (primarily) that the presence on one side face of certain panels (or all side panels) makes those panels essentially unstowable. That is, they cannot be laid flat one upon the other. Additionally, such fixed clips, if damaged, can not be readily replaced. Yet further, such clips are not versatile in that the owner or driver cannot select precisely where such clips are to be used or applied without employing an entire panel. Finally, the clips must be spaced free of the dividing and backing or retainer stakes.

BRIEF DESCRIPTION OF THE INVENTION

The subject invention is directed to a removable tarpaulin or tarp holder which is mountable in the dividing and/or backing stakes utilized to hold and retain the removable side panels of a flat bed trailer. The preferred form comprises a shaped metal rod or wire which, in an inboard part thereof, is inserted down into the hollow centers of the stakes. In the outer part thereof, a loop is provided extending down below the tops of the side panels and then upwardly to receive and retain either the entire tarp or one side edge thereof.

The subject device may be of alternative forms. Another form involves a hollow socket adapted to be inserted into a stake with the outboard portions of the holder or receiver single piece members. The previously noted preferred form involves a rod or wire formed or bent upon itself to provide paired members, including a first vertical paired portion adapted to fit into the stakes, a second paired vertical portion adapted to lie alongside the stakes and a third vertical portion adapted to lie outside the tarpaulin.

OBJECTS OF THE INVENTION

The first object of the subject invention is to provide improvements in tarp or tarpaulin receivers or holders which cooperate with the side panels and stake holders which engage with the stake supports for the side panels of flat bed truck trailers.

Another object of the invention is to provide such tarp holders or receivers which will replace the conventional metal clips conventionally fixed to the outboard or outer faces of certain side panels, thus making those particular side panels unstowable.

Another object of the invention is to provide tarp receiving holders, receivers, or clips which are removably mountable in the hollow centers of dividing and/or backing stakes used to receive and retain the removable side panels of flat bed trailers.

A further object of the invention is to provide simple, strong, easily fabricated, long-lived and versatile tarp receivers, holders and clips which strongly and safely retain the tarpaulin in all its modes of use with respect to the truck trailer load receiving zone, yet are completely and swiftly, as well as easily, removable from the engaged parts of the truck, thus to permit full and complete storage of the side panels, the top beams and dividing and backing stakes independent of the said tarp holder improvements.

Another object of the invention is to provide such tarp holders, receivers, clips or retainers which may be engaged in the upper ends of dividing stakes without interfering with the engagement therewith of the top transverse beams over the load zone.

Another object of the invention is to provide varied and versatile forms of improved tarp clips and holders of the character described.

Other and further objects of the invention will appear in the course of the following description thereof.

THE DRAWINGS

In the drawings, which form a part of the specification and are to be read in conjunction therewith, embodiments of the invention are shown and, in the various views, like numerals are employed to indicate like parts.

FIG. 1 is a three-quarter perspective view from the front and slightly above of the preferred form of the subject tarp holder or clip.

FIG. 2 is a three-quarter perspective view from the front and slightly above of a second form of the subject device.

FIG. 3 is a vertical plan view, from above, of a portion of one side of one wall of the flat bed truck trailer showing three stake stations therealong securing one full side panel therebetween, with the subject device of FIG. 1 employed in each of three stake stations thereof. The tarp is shown schematically received in the loops of the tarp holder.

FIG. 4 is a three-quarter perspective view from above of a section of a flat bed truck trailer with the conventional panels erected at the sides thereof and the subject device of FIGS. 1 and 3 employed on the side nearest the viewer in three stations, involving two dividing stakes and one retaining stake. The side nearest the viewer shows substantially the structures seen in FIG. 3.

FIG. 5 is an enlarged, top plan view of one of the dividing stake stations of FIG. 3, showing details of the side wall panel mounting, the ends of the transverse beams and the subject device shown engaged in the outboard portions of all stakes.

FIG. 6 is a front view of the station of FIG. 5.

FIG. 7 is a side view of the station of FIGS. 5 and 6.

FIG. 8 is a top plan view of a tarp holder of FIG. 2 inserted in a retaining stake.

STRUCTURE AND FUNCTION

It should be noted that the subject devices may be used on one or both sides of the truck. When used on one side of the truck, only, then the tarpaulin is necessarily removed to that side alone. When used on both sides of the truck trailer, the tarp may be removed from the load to either side.

Referring first to FIG. 4, therein is shown a portion of a flat bed trailer having a base frame or chassis designated 10. Base 10 supports the floor 11 which has lateral extremities or flanges 12 thereon. Stake receiving sockets 13 are spaced at regular intervals (conventionally or typically two feet apart) along the length thereof. In the view of FIG. 4, there are shown two conventional, opposed side panels 14 and 15 which are rigidly engaged between dividing stakes 16 and 17 on the near side for panel 14 and 18 and 19 for panel 15 on the far side. End portions of additional panels 20–23, inclusive are shown in the view, their ends also engaged by the T bars of the dividing stakes.

There are also seen one essentially completely shown retaining stake 24 and the top end of the opposed retaining stake 25. Arcuate cross beams 26 and 27 communicate between and are socketed at the end portions thereof in dividing stakes 16 and 18 and 17 and 19, respectively. The end configuration of the arcuate cross beams may be seen in FIGS. 5–7, inclusive, where the enlarged structure of dividing stake 16, cross beam 26 and the tarp holder associated therewith are seen enlarged. The end portions of panels 22 and 14 are also seen in FIG. 5.

FIGS. 2 AND 8

Referring first to FIGS. 2 and 8, therein is shown a first, but not preferred, form of the invention wherein the tarp holder is entirely made up of single member or piece units, rather than double member units. While this device will operate to hold and receive the tarpaulin in both modes as desired (over the load at the edges and stored at one side thereof), it is more expensive to fabricate, requires an engagement with the transverse beams over the load when used in dividing stakes and projects sidewards, outwards or laterally further than the preferred form of the invention seen in the other figures. However, because of its structural simplicity, it will be first described.

In FIG. 8, at 30, there is seen the top edge of the midportion of a side panel like panel 14 in FIG. 4. At 31 is seen the top edge portion of a retaining stake like stake 24 in FIG. 4. It should be noted that the top edges of the retaining and dividing stakes slope downwardly outwardly, as may be best seen in FIGS. 6 and 7, top centers of the views, wherein is seen the top end portion or edge 16a of dividing stake 16. For illustrative purposes in the manner in which the tarp holder or clip of FIG. 2 is employed, a cross beam or rod 32 is shown engaged with the retaining stake 31, as well as the inboard vertical portion 33 of the holder of FIG. 2. This is not usual, as previously noted, that is, the cross beams are conventionally, preferably and typically engaged with the dividing stakes which engage the ends of the side panels.

At any rate, the holder of FIG. 2 has three normally vertical members therein, first or inboard member 33, second, normally vertical, inboard top holding member 34 having an inwardly angled upper portion 34a and third, outboard, tarp receiving or holding member 35 having an upwardly extending high end 35a. The first member 33 is a hollow, cylindrical pipe which is of such outer diameter as to be readily received downwardly in the triangular hollow center 31a of a retaining or dividing stake as seen in FIG. 8. The upper end 33a thereof has normally horizontal surrounding flange 36 operative to connect at its outer outboard edge to angled upper portion 34a of second vertical member 34. Arcuate connecting end 37 connects together the bottom ends of second and third normally vertical members 34 and 35 and optionally may be a substantially horizontal flat wall. A reinforcing rod 38 may be welded or otherwise fixedly attached to second and third vertical members 34 and 35 for strengthening and/or rigidifying purposes.

In operation, as may be seen in FIG. 8, the elongate hollow cylinder 33 is inserted down into the hollow triangular center 31a of stake 31. Since the outboard portions of retaining and dividing stakes are typically the same, FIG. 8 shows how the holder of FIG. 2 would engage with dividing stakes as well. One outboard end of transverse beam 32 is then inserted into hollow cylinder 33 and engaged therewith. Thus, to remove the holder of FIG. 2 from stake 31, beam 32 must first be disengaged therewith. The downwardly slanted inboard holder portion 34a overlies the downwardly slanted upper edge of stake 31. Vertical portion 34 lies against or closely adjacent the outboard front edge of stake 31. Thus it may be seen that vertical members 34 and 35 are positioned entirely outboard of the outboard edge of stake 31.

FIG. 7 shows how a canvas tarpaulin edge is received in the holder of the figures other than FIGS. 2 and 8 when the tarp overlies the load. This relationship is the case in the device of FIGS. 2 and 8. FIGS. 3 and 4 schematically show tarpaulin 49 retained after removal from the load in the holders of the other figures. This relationship also applies with respect to the devices of FIGS. 2 and 8.

Typically, a tarpaulin used over a flat bed trailer is ten feet wide. The dividing and backing stakes are typically forty two to forty eight inches in length. The depth of the holder, whose active, tarp engaging parts are members 34 and 35, must be sufficient to receive the tarp overlap side drape to avoid wear on the bottom edges thereof (FIG. 7) and also sufficient depth, coupled with width, to receive the entire tarpaulin on one side. Sometimes a high load will vary the tarp overlap side drape. The maximum overlap is defined by the cross beams 26, 27, 32. The devices of FIGS. 2 and 8, as well in the other figures, may be inserted into either or both dividing or backing stakes.

THE PREFERRED FORM

Referring particularly to FIGS. 1, 5, 6 and 7, therein is seen the preferred form of tarp holder, clip or receiver, generally designated 40. This device, in the manner of the device in FIG. 2, has a first normally vertical portion which is removably receivable in a dividing or backing stake and second and third vertical portions or members which form the inboard and outboard parts of the actual tarpaulin receiving, retaining and holding portions. Interconnecting pieces are also provided. However, in this case, all of the vertical members are paired, this configuration arising from the fact that the entire tarp receiver is formed from a single, relatively small diameter metal rod or wire.

The inboard most normally vertical portions 41 preferably have free, unattached ends which, due to the normal spring of the wire or rod, tend to be spaced apart, one from the other. To insert same into the hollow triangular center of a stake, elongate vertical pieces 41 must be pressed together. Their spring-apart action then seats them in the outboard edges of the triangular center stake as seen in, particularly, FIGS. 5 and 6.

Normally horizontal or arcuate connection portions 42 join the top ends of rods 41 to the top ends of inboard loop members 43. As may be seen in FIGS. 6 and 7, vertical inboard loop members 43 extend downwardly along the exterior sides of stake 16 inboard of the outboard edge 16b of stake 16. Legs 41 and 43 optionally may be substantially the same length. Rods 41 must be so sized that they can fit into the dividing and backing stakes in addition to the portions of the cross beams as seen at 26a in FIGS. 6 and 7.

Outboard elongate leg members 44 are joined together at their top by arcuate portions 45 and, at their lower ends, to the bottom ends of legs 43 by arcuate retainer portions 46. Thus it can be seen that tarp receivers of paired member construction may be provided wherein the engagement with the stake may be at the inboard portion of the stake next to the panels, while the inboard portion of the loop begins at the same position. Thus, the outboard extension of the device of the figures other than FIGS. 2 and 8 is much less than that of those figures. Additionally, the spring of the wire or rod member tends to keep it wedged tightly in the stake it engages. Yet further, there is no necessary engagement with a transverse beam such as 26 or 27 and thus, once the tarp is removed from the load and the receivers, the tarp clips may be removed from the stakes without moving the cross beams.

The details of the structure of the dividing stakes may be seen in FIGS. 3, 5 and 7. These conventional stakes not only have the triangular section outboard structure in the manner of the backing or retaining stakes, but also have an inwardly extending, T section base with an elongate rectangular flat plate member 47 inboard connected to the inboard face of the triangular stake portion by elongate flange 48. This conventional structure receives the end edges of the side panels as seen in detail in FIGS. 3, 5 and 7.

In FIG. 7, tarp 49 has one side edges 50. Retaining loops 51 are shown at intervals (see FIG. 4) fixed to the tarp next to the side edges adapted to be engaged by rings 52 to which are removably attached cables or wires 53. Cables 53 are adjustably engagable to loops or fingers 54 (FIG. 4) on the trailer frame.

As previously mentioned, FIG. 7 shows the tarpaulin 49 stretched over a conventional load of grain or the like 55 (FIG. 7) with the side edge 50 of the tarp held by cables 53 outboard of stakes 16, etc. and within the retainer 40. FIGS. 3 and 4 show the tarp 49, still engaged by the cables 53 on the one side, passed over the load to be received in the tarp receivers or clips on the side illustrated. It should also be noted that the cross beams 26 and 27 can be removed from the stakes without disturbing the tarp clips, as well as vice versa. Upon reloading, or if it is desired to recover the trailer, the operator merely pulls the tarp across the top beams 26 and 27 and resecures it on the other side.

The purpose of the extension of the tarp receivers or clips above the level of the cross beams 26, 27 is several fold. In the first place, it is desirable that they be visible from the other side of the trailer when the tarp is being handled. Secondly, as the tarp is shoved or pushed across the cross beams into the received position shown in FIGS. 3 and 4, the upper portions of legs 44 prevent the tarp from falling outboard of the tarp receiving clips and receive the tarp into the loop of the retainers. This extension is preferably four the six inches above the uppermost portions of beams 26 and 27. While it is feasible that the retainers 40 be employed in every adjacent stake as seen in FIG. 4 so that 20 would be employed along the side, a minimum of 5 retainers will be operable. Alternatively, they may be received in every other stake.

The following typical, but not limiting, dimensions may be given to give an idea of optimum scale. The length of legs 41 and 43 may be sixteen to twenty four inches. Legs 44 typically would range from twenty two to thirty eight inches in length, depending on the requirements of tarpaulin drape. The radius between leg 41 and 43 is preferably approximately one inch. The radius at 46 is preferably approximately two inches and the radius at 45 is preferably approximately five inches. The rod size may range from one quarter to three eight inch diameter optimally, as necessary to provide necessary strength. This is steel wire or rod.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A tarp holder for use with the normally vertical dividing stakes securing removable side panels for a flat bed truck trailer and, further, the normally vertical retaining stakes therefor, said dividing and retaining stakes being hollow centered, at least in the upper portion thereof, in order to receive therewithin the outboard, normally vertical ends of cross beams which overlie the trailer body, comprising:

an integral tarp holder removably engagable with one such stake having the following parts:

a first normally vertical insert length adapted to be removably inserted down into the hollow center of one of said stakes, a second normally substantially horizontal inboard top member adapted to limit insertion of said insert length in said stake connected to the upper end of said length and further extending outboard of said stake, a tarp retaining loop having a third normally substantially vertical inboard part connected at its upper end to the inner top member and extending downwardly therefrom, a fourth normally substantially horizontal bottom part connected at its inboard end to and extending outwardly away from said third inboard part and a fifth normally substantially vertical outboard part connected at its lower end to the outboard end of the fourth bottom part and extending upwardly therefrom past the second inner top member, the first length so configured in the portion thereof insertable within said stake as to permit the simultaneous presence in said stake therewith of a cross beam end, and the fifth outboard part being of a length substantially greater than the third inboard part whereby to extend substantially upwardly thereabove and therepast and above said stake.

2. A holder as in claim 1 wherein all of the parts of the tarp holder are single piece members, the first insert length being a hollow tube adapted to removably receive the end of a cross beam therewithin.

3. A holder as in claim 1 wherein each of the parts of the tarp holder are paired members.

4. A holder as in claim 3 wherein the paired members making up the outboard fifth part of the loop are joined together at their top.

5. A holder as in claim 1 wherein the holder is formed from a single metal wire member doubled upon itself, whereby all of the parts thereof are double members.

6. A holder as in claim 1 wherein the first insert length, the second top member and the third inboard part of the loop are all positioned inboard of the outermost extension of the dividing panel stake when engaged therewith.

7. A holder as in claim 6 wherein the first insert length, the second top member and the third loop inboard part are all double members.

8. A holder as in claim 7 wherein the fourth and fifth loop bottom and outboard parts are also double members.

9. A tarp holder removably engagable with a normally vertical stake used to secure or retain removable, normally vertical side panels for a flat bed truck trailer, such panel stake being hollow centered, at least in the upper portion thereof, in order to receive therewithin the outboard, normally vertical ends of cross beams which overlie the trailer body, comprising:

a first normally vertical member adapted to be removably inserted down into the hollow center of a paneled stake from the upper end thereof, a second normally vertical member adapted to be positioned outside of but closely adjacent to said stake when said first member is engaged with said stake, a third normally vertical member adapted to be positioned adjacent the panel stake, outside thereof and spaced outwardly both therefrom and from the second member when the first member is engaged in said stake, fourth normally substantially horizontal means connecting the tops of the first and second members together, and fifth normally substantially horizontal means connecting the bottoms of the second and third members together, said first member so configured in the portion thereof insertable within said panel stake as to permit the simultaneous presence in said stake therewith of a cross beam end, and the third vertical member being of substantially greater length than the second vertical member, whereby to extend substantially upwardly thereabove and therepast and above said stake.

10. A tarp holder as in claim 9 wherein said three members and fourth and fifth means interconnecting same are strong and shape retaining, yet somewhat resilient.

11. A tarp holder as in claim 9 wherein all of the parts of the tarp holder are single piece members, the first vertical member being a hollow tube adapted to removably receive the end of a cross beam therewithin.

12. A holder as in claim 9 wherein all of the parts of the tarp holder are paired members.

13. A holder as in claim 12 wherein the paired members making up the third normally vertical member are joined together at their tops.

14. A holder as in claim 9 wherein the three normally vertical members and the fourth and fifth means interconnecting same are formed from a single metal wire member doubled upon itself, whereby all of the parts thereof are double members.

15. A holder as in claim 9 wherein the first and second vertical members and the fourth means interconnecting the tops thereof are positioned inboard of the outermost extension of the panel stake when engaged therewith.

* * * * *